(12) United States Patent
Millet et al.

(10) Patent No.: US 8,803,460 B2
(45) Date of Patent: Aug. 12, 2014

(54) DEVICE FOR QUICKLY GENERATING A TORQUE ON AN EXTENDED DYNAMIC RANGE WITH LOW INERTIA

(75) Inventors: Guillaume Millet, Bourg-la-reine (FR); Vincent Hayward, Paris (FR); Dogan Sinan Haliyo, Paris (FR); Stéphane Regnier, Bois-Colombes (FR)

(73) Assignees: Universite Pierre et Marie Curie (Paris 6), Paris (FR); Centre National de la Recherche Scientifique, Paris (FR)

( * ) Notice: Subject to any disclaimer, the term of this patent is extended or adjusted under 35 U.S.C. 154(b) by 439 days.

(21) Appl. No.: 13/255,829

(22) PCT Filed: Mar. 9, 2010

(86) PCT No.: PCT/EP2010/052970
§ 371 (c)(1),
(2), (4) Date: Sep. 9, 2011

(87) PCT Pub. No.: WO2010/102998
PCT Pub. Date: Sep. 16, 2010

(65) Prior Publication Data
US 2012/0001572 A1    Jan. 5, 2012

(30) Foreign Application Priority Data
Mar. 12, 2009   (FR) ...................................... 09 01136

(51) Int. Cl.
*H02P 7/00* (2006.01)

(52) U.S. Cl.
USPC .......................................... 318/432; 318/434

(58) Field of Classification Search
USPC ........... 318/432, 434, 560, 41, 48, 59, 66, 69, 318/98
See application file for complete search history.

(56) References Cited

U.S. PATENT DOCUMENTS

| | | | | |
|---|---|---|---|---|
| 4,484,871 A | * | 11/1984 | Adman et al. | 418/69 |
| 4,686,433 A | * | 8/1987 | Shimizu | 318/50 |
| 5,327,986 A | | 7/1994 | Saita | |
| 6,698,313 B2 | * | 3/2004 | Gaffney et al. | 74/665 N |
| 7,014,008 B2 | * | 3/2006 | Furumi et al. | 180/443 |
| 2008/0223640 A1 | * | 9/2008 | Clauson | 180/69.6 |
| 2010/0039052 A1 | * | 2/2010 | Horst et al. | 318/8 |

FOREIGN PATENT DOCUMENTS

| | | |
|---|---|---|
| GB | 714 735 A | 9/1954 |
| JP | 8-258728 A | 10/1996 |

* cited by examiner

*Primary Examiner* — Rina Duda
(74) *Attorney, Agent, or Firm* — Sughrue Mion, PLLC

(57) ABSTRACT

A device, having first and second motor units, for generating a torque on an output member in response to a torque setpoint. The first motor unit includes at least one motor of a first power, or small motor, having a shaft to which the output member is connected. The second motor unit includes at least one motor of a second power higher than the first power, or large motor, having a shaft rotationally connected to the output member via viscous coupler, and computer programmed, in response to a torque setpoint, to power the second motor unit so that the viscous coupler provides a viscous torque conforming to the torque setpoint. Further, in parallel with this, the first motor unit is powered so that it produces the additional torque between the torque setpoint and the viscous torque until the viscous torque reaches the value of the torque setpoint.

6 Claims, 3 Drawing Sheets

DEVICE FOR QUICKLY GENERATING A TORQUE ON AN EXTENDED DYNAMIC RANGE WITH LOW INERTIA

CROSS REFERENCE TO RELATED APPLICATIONS

This application is a National Stage of International Application No. PCT/EP2010/052970 filed on Mar. 9, 2010, which claims priority from French Patent Application No. 09 01136, filed on Mar. 12, 2009, the contents of all of which are incorporated herein by reference in their entirety.

The invention relates to a device with low inertia for quickly generating a torque over an extended dynamic range.

BACKGROUND OF THE INVENTION

In the field of haptic interfaces, notably force feedback devices, for example an orthosis intended to rehabilitate the motor capabilities of a patient, it is common practice to use a motor to exert a force or a torque that simulates the resistance of the environment to the movement of the device. To simulate a virtual contact, for example, an electric motor is controlled so that it exerts on an output member of the device a resisting torque that opposes the movement of the device required by the operator.

To simulate contact with a virtual rigid surface, the motor must react as a real rigid surface would. Unfortunately, it is known that a powerful motor generally has high friction torque, which limits its capacity to produce forces of low amplitude for simulating an unrestricted movement or the feel of a texture. Moreover, such a motor has high inertia that may be felt by the operator.

To compensate this friction and this inertia, a force servo-control loop may be used employing a torque meter to measure directly the torque at the output of the actuator. In addition to the construction difficulties inherent to torque meters, their location in the dynamic system is critical to obtaining a good compromise between stability and precision.

A less powerful motor may be used having low friction and low inertia. However, such a motor loaded in this way would often be operating at the limit of its capabilities and would therefore have a limited service life.

OBJECT OF THE INVENTION

The object of the invention is to provide a device with low inertia for generating a force quickly over a wide dynamic range.

BRIEF DESCRIPTION OF THE INVENTION

To achieve the above object, there is proposed a device for generating a torque on an output member in response to a torque setpoint, including:
 a first motor unit including at least one motor of a first power, or small motor, having a shaft to which the output member is connected;
 a second motor unit including at least one motor of a second power higher than the first power, or large motor, having a shaft rotationally connected to the output member via at least one associated viscous coupler; and
 servo-control means programmed, in response to a torque setpoint, to power the large motor so that the viscous coupler provides a viscous torque conforming to the torque setpoint and, in parallel, to power the small motor so that it produces the additional torque between the torque setpoint and the viscous torque until the viscous torque reaches the value of the torque setpoint.

The term "viscous" refers to the fact that the torque developed by the viscous coupler is proportional to the difference between the rotation speeds of the two shafts.

Accordingly, if the torque setpoint is suddenly increased when the motors are in a steady regime in which the shaft of the large motor is turning at constant speed or is stationary, the large motor is supplied with power to accelerate the shaft of the large motor as quickly as possible so that the difference in speed between the shafts of the two motors increases quickly, which causes an increase in the viscous torque produced by the viscous coupler, which progressively increases to the required torque.

In parallel with this, the small motor is also powered to provide the torque difference between the torque setpoint and the viscous torque, with an amplitude within the limits of its capabilities. Moreover, because of its low inertia and its low friction, the small motor has a much greater dynamic range and is therefore able to respond quickly to this loading.

The output member is subjected at all times to the sum of the torque at the shaft of the small motor plus the viscous torque generated by the viscous coupler. This sum is substantially equal to the torque setpoint, possibly except at the very beginning of the response period if the torque setpoint exceeds the maximum torque that the small motor can produce.

The device of the invention thus has low inertia and responds quickly to a torque setpoint over a wide range of amplitudes. The inertia of the large motor is filtered by the viscous coupler and the servo-control means, with the result that the operator does not feel it.

BRIEF DESCRIPTION OF THE FIGURES

The invention can be better understood in the light of the following description of a device of one particular embodiment of the invention, which is given with reference to the appended drawings, in which.

DETAILED DESCRIPTION OF THE FIGURES

Figure 1:
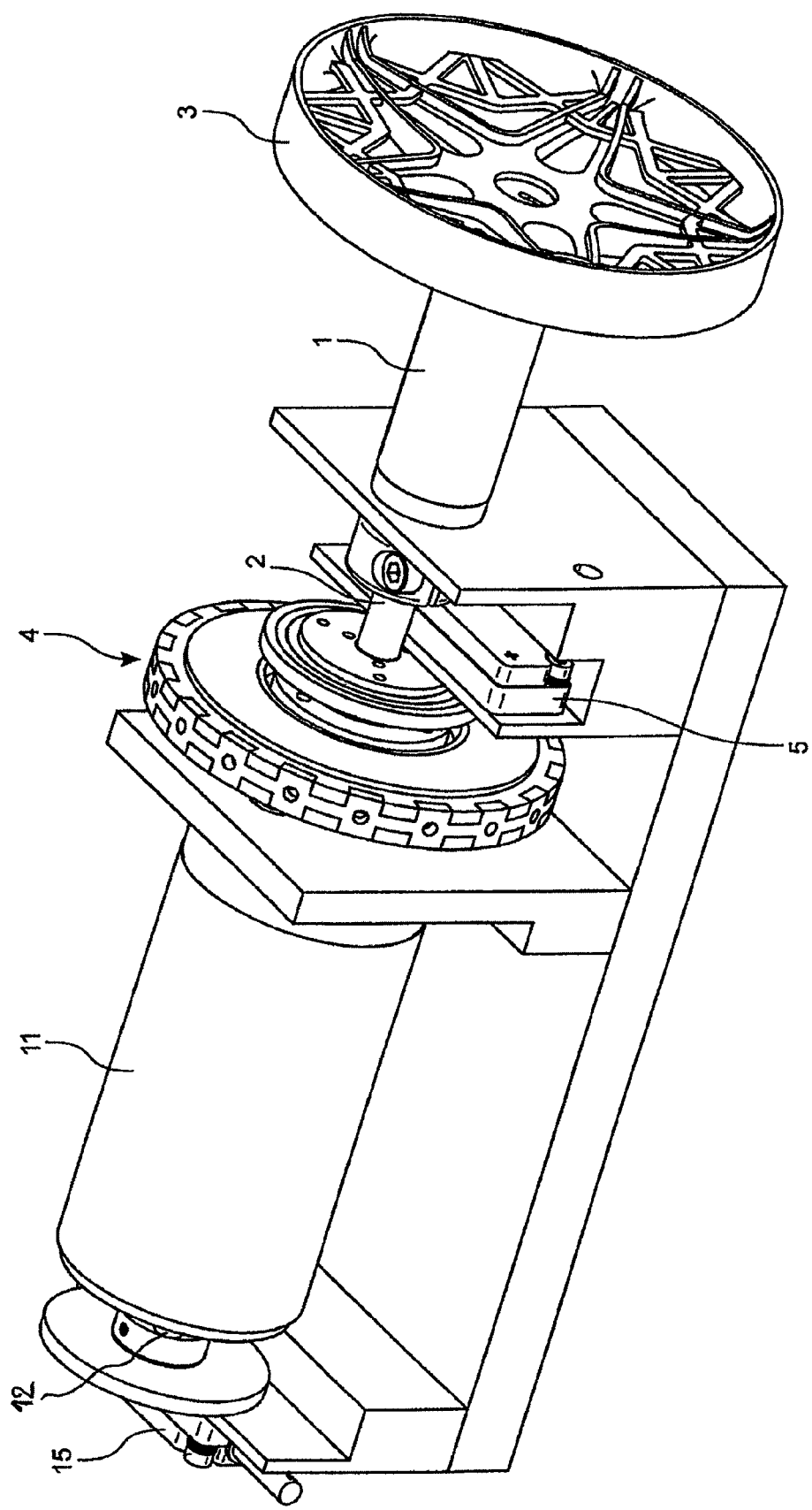
FIG. 1 is a perspective view of a device of the invention.

Referring to FIG. 1, the device of the invention includes a first motor unit, here comprising an electric motor 1 of a first power (referred to herein as the small motor) and having a shaft 2 with one end that carries an output member 3 to which it is required to apply a given torque. Here the output member is symbolically represented by a wheel. This may be a steering wheel or a handle manipulated by the operator.

The device includes a second motor unit, here comprising a motor 11 of greater power (referred to herein as the large motor) having a shaft 12 that is connected to the shaft 2 of the small motor 1 via an eddy current coupler 4.

As is obvious to the person skilled in the art, the output member 3 is therefore subjected to the torque exerted by the small motor 1 on its shaft 2 plus the torque exerted on the shaft 2 of the small motor 1 by the coupler 4.}

Here the coupler 4 is a viscous coupler that generates torque proportional to the difference between the rotation speeds of the shafts of the motors 1, 11 in accordance with the equation:

$$M_{visc} = b \times (\omega_{11} - \omega_1),$$

where $\underline{b}$ is the coefficient of viscosity of the coupler, and $\omega_{11}$ and $\omega_1$ are the rotation speeds of the shafts 12, 2 of the motors 11, 1.

Figure 2:
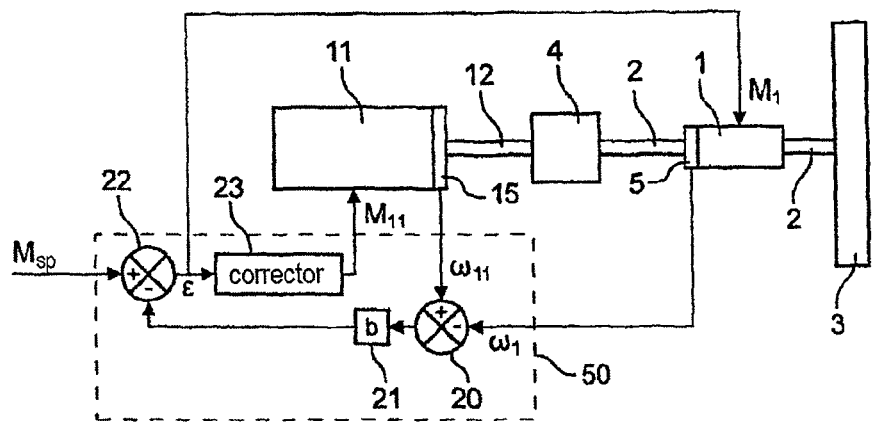
FIG. 2 is a block diagram of one possible servo-control system for a device of the invention.

The two motors 1, 11 are servo-controlled by the system shown in the FIG. 2 diagram. In that diagram, there can be seen the small motor 1 and its output shaft 2, the coupler 4, the large motor 11 and its output shaft 12, and the output member 3. A computer 50, symbolically represented by the dashed-line box in FIG. 2, is responsible for servo-controlling the motors in accordance with the servo-control method described below.

For the purposes of explanation, the starting situation is one in which the shafts 2, 12 of the motors are in a steady regime in which the shafts are stationary, with the result that no torque is generated by the coupler 4. The output member 3 is held by the operator.

The computer 50 then receives a torque setpoint $M_{sp}$. From this setpoint, the computer generates two operational setpoints $M_1$, $M_{11}$ that are sent to the small motor 1 and the large motor 11, respectively. Here these setpoints are represented diagrammatically as being sent directly to each of the motors. It must of course be understood that the motors 1, 11 receive electrical power in amounts that are controlled so that the torques generated by these motors are images of the corresponding operational setpoints.

As may be seen in the diagram, the small motor receives an operational setpoint $M_1$ that is the output of a comparator 22 that generates a difference signal $\epsilon$ equal to the torque setpoint $M_{sp}$ minus the estimate $\tilde{M}_{visc}$ of the viscous torque $M_{visc}$ generated by the coupler 4. The output of the comparator 22 is processed by a corrector 23 in order to generate an operational setpoint $M_{11}$ for the large motor 11. The function of the corrector 23 is to improve the speed and the accuracy of the response of the large motor 11.

The estimate $\tilde{M}_{visc}$ of the viscous torque $M_{visc}$ generated by the coupler 4 is produced by the computer using position sensors 5, 15 associated with the small motor 1 and the large motor 11, respectively, which sensors supply to the computer 50 the angular positions of the shafts of the motors 1, 11. The speeds $\omega_1$ and $\omega_{11}$, derived from these angular positions, are compared by the comparator 20, and the difference between them is multiplied by a gain 21 of value $\underline{b}$ equal to the coefficient of viscosity of the coupler 4 in order to establish the estimate $\tilde{M}_{visc}$.

Figure 3A:
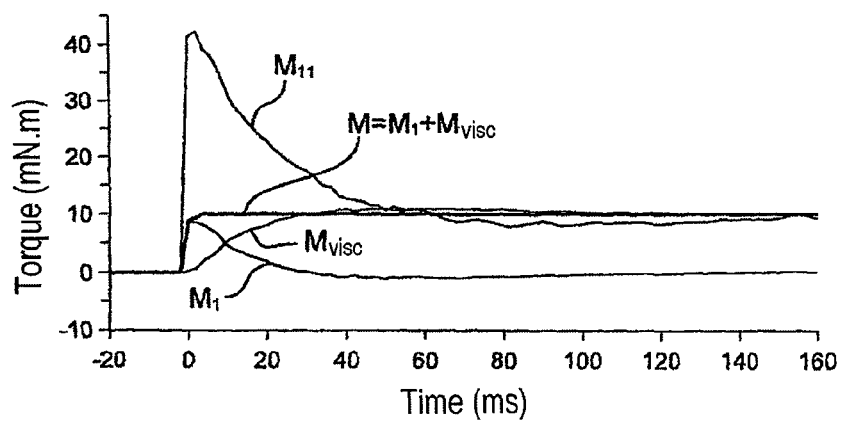
FIGS. 3A and 3B are two graphs of the response of a device of the invention to a torque setpoint.

FIG. 3A shows the response of the device to a torque setpoint $M_{sp}$ of step form rising from 0 to 10 milli newton meters (mN·m) at time t=0. In response to this setpoint, the corrector 23 sends the large motor 11 a high operational setpoint $M_{11}$ (here of the order of four times the target torque) in order for its shaft 12 to accelerate very quickly. Because of this acceleration, the viscous torque $M_{visc}$ increases progressively.

During this time, the small motor 1 supplies additional torque that is substantially equal to the operational setpoint $M_1$, ignoring delays that are short compared to those of the torque $M_{11}$. Here it has intentionally been decided to limit the setpoint to a maximum value, in this instance 8 mN·m, to protect the small motor 1. Because of the progressive increase in the viscous torque $M_{visc}$, the operational setpoint $M_1$ applied to the small motor decreases proportionally until it reaches zero when the viscous torque $M_{visc}$ becomes equal to the torque setpoint $M_{sp}$. The small motor 1 is then completely relieved of load. The graph shows the torque of the small motor progressively falling to zero as the viscous torque increases.

During this time, the shaft of the large motor 11 stabilizes at a speed for which the torque $M_{11}$ exerted by the large motor 11 on its shaft is substantially equal to the sum of the torque setpoint plus the friction torque of the large motor.

The response torque M of the system (in bold on the graph) is the sum of the torque $M_1$ exerted by the small motor plus the torque $M_{visc}$ exerted by the viscous coupler. It is found to follow closely the step-form setpoint, except at the start, for the length of time that the viscous torque takes to reach the difference between the torque setpoint (10 mN·m) and the maximum torque of the small motor (8 mN·m), that is to say 2 mN·m.

Figure 3B:
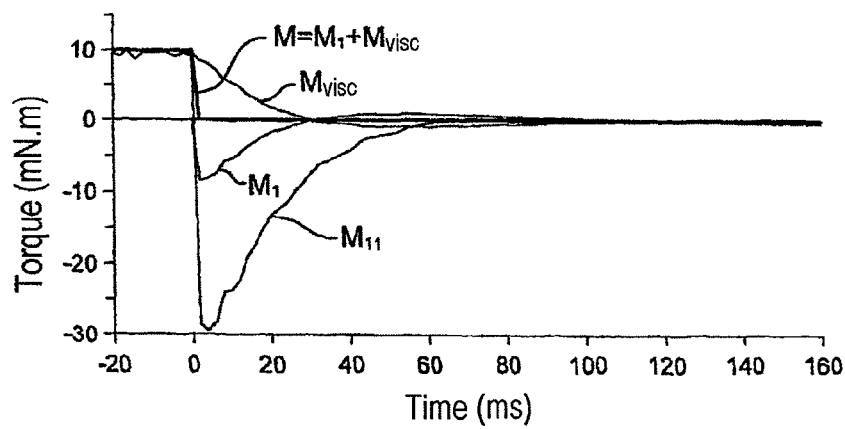

FIG. 3B shows the response of the device to a step-form torque setpoint falling from a value of 10 mN·m to 0. It is likewise seen that it closely follows the step-form setpoint.

The device of the invention thus enables a response very close to the step-form torque setpoint without the operator feeling the inertia or the friction of the large motor.

The device of the invention is extremely simple and lends itself to modification. For example, the output of the coupler 4 may be connected to the output member 3 not via the shaft of the small motor, as shown, but directly, the output member 3 still being connected to the output shaft of the small motor of course.

Furthermore, although in the example shown here the first motor unit (the small motor) comprises a single motor, a plurality of motors could of course be coupled together. Similarly, although the second motor unit (the large motor) here comprises a single motor associated with a corresponding coupling member, the second motor unit could include a plurality of motors, if appropriate each associated with an individual coupling member. Alternatively, the motors constituting the second motor unit may all mesh with a common gear that is connected to the output member via a single coupling member.

Moreover, although the operational setpoint $M_{11}$ delivered to the second motor unit is produced here by a corrector from a difference between the torque setpoint $M_{sp}$ and the estimated viscous torque $\tilde{M}_{visc}$, the operational setpoint $M_{11}$ could be produced in any other way. For example, the estimate of the viscous torque obtained here by measuring rotation speeds could equally well be obtained by means of an estimator or a model of the motor units. The operational setpoint $M_{11}$ may be produced directly from the torque setpoint $M_{sp}$, either by processing it by means of a corrector or merely by sending the second motor unit the torque setpoint $M_{sp}$ as its operational setpoint.

Figure 4:
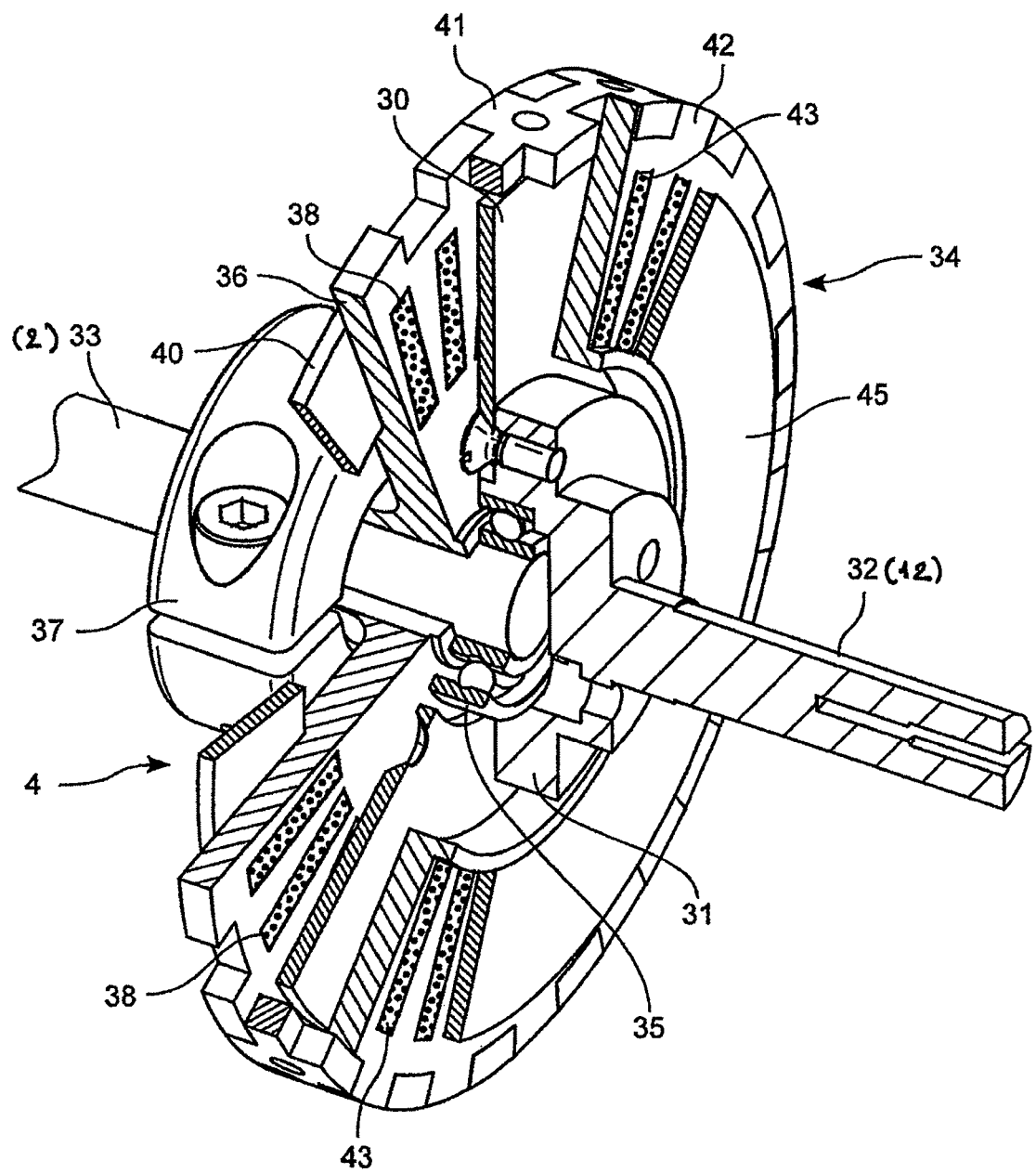
FIG. 4 is a partially cutaway perspective view of a viscous coupler that is particularly suitable for a device of the invention.

FIG. 4 shows partly in section the construction of an eddy current viscous coupler 4 that is particularly suitable for a device of the invention. It comprises a metal (for example aluminum) disk 30 screwed to the hub 31 of an output shaft 32 that is connected to the shaft 2 of the small motor 1, as may be seen in FIG. 1. The coupler has an input shaft 33 that is connected to the shaft 12 of the large motor 11 and carries a cage 34 surrounding the disk 30, as may be seen in FIG. 1. The shafts 32, 33 are held on a common axis by a rolling bearing 35.

The cage 34 includes a first flange 36 that is clamped onto the input shaft 33 by means of a clamping collar 37. The first flange 36 includes a plurality of radial notches receiving permanent magnets 38 all of which have polarization directions parallel to the axis of rotation of the shaft 32, 33 but with the polarization direction alternating from one magnet to the next. On one side of the first flange 36 the magnets 38 face the disk 30 and on the other side they are in contact with an annular ferromagnetic metal plate 40 that is carried by the first flange 36 and that closes the magnetic flux lines between adjacent magnets. At its periphery, the first flange 36 has crenellations that are engaged in lateral recesses on one side of a peripheral belt 41. Similar lateral recesses on the other side of the peripheral belt 41 cooperate with peripheral crenellations of a second flange 42. The second flange 42 includes the same number of notches as the first flange 36 and receiving permanent magnets 43 that have polarization directions parallel to the axis of rotation of the shafts 32, 33, the polarization direction alternating from one magnet to the next. On one side of the second flange 42 the magnets 43 face the disk 30 and on the other side they are in contact with an annular ferromagnetic metal plate 45 carried by the second flange 42 that closes the magnetic flux lines between two adjacent magnets. Here the flanges 36, 42 and the peripheral belt 41 are produced in plastics materials.

The magnets 38, 43 carried by the two flanges 36, 42 face one another in such a way that two facing magnets have the same polarization direction. The magnets disposed in this way generate magnetic flux between the flanges 36, 42, having flux lines that are perpendicular to the disk 30 and oriented in alternation from one flange to the next. Such a coupler creates a magnetic torque proportional to the difference between the rotation speeds of the disk 30 and of the cage 34. The clearance between the permanent magnets 38, 43 and the disk 30 is preferably very small to reduce losses.

Other constructions of the viscous coupler 4 are possible. A first variant is a tubular configuration in which the metal disk is replaced by a tube turning between two tubular flanges carrying magnets that are radially polarized. Finally, the magnets may have any other arrangement instead of the alternating arrangement shown, for example an arrangement constituting a Halbach array.

Other types of viscous coupler could be used instead of an eddy current viscous coupler, such as a hydraulic coupler.

The invention has diverse potential applications. Haptic systems generally cover any device in contact with a human being. A rehabilitation orthosis benefits from actuators of low mechanical impedance. This property widens the range of impedances that may be programmed. In the fields of virtual reality and remote operation highly-transparent systems can be designed.

In the field of instrumentation, vibrating dashpots with a very low apparent mass can be produced that are able to provide high force over a wide bandwidth. In this way a structure could be identified by methods involving excitation by random wide-band signals without disturbing the measured structure. Another application relates to active suspensions for isolating loads from ambient vibrations with interference being rejected over a wide band (anti-vibration tables, active levitation).

There may be possibilities for active suspensions in the field of transportation, as well as in electro-mechanical actuation of disk brake calipers.

In the field of robotics, high-performance (very fast and very light) assembly systems with controlled contact forces could be produced (for assembling electronic components, foodstuff products, consumer mechanical devices). High-speed systems could be produced in which the success of the process depends on the forces applied despite geometrical uncertainties (polishing, engraving, deburring).

In the field of medical devices, gantries could be produced for X-ray tubes (and other mobile, positron, etc. imaging systems) sufficiently powerful to sustain high loads but also accurate, vibration-free, and compatible with contact with humans (accidental or otherwise). A low-interaction device could equally be produced for permanent contact with an oscillating living physiological organ such as a beating heart.

In the aerospace field, high-performance servo-controlled aiming systems could be produced (for antennas, radar).

What is claimed is:

1. A device for generating a torque on an output member, including:
    a first motor unit including at least one motor of a first power, having a shaft to which the output member is connected; and
    a second motor unit including at least one motor of a second power higher than the first power, having a shaft rotationally connected to the output member via coupling means;
    wherein the coupling means are viscous coupling means and wherein the device includes servo-control means programmed, in response to a torque setpoint, to power the second motor unit so that the viscous coupling means provide a viscous torque conforming to the torque setpoint and, in parallel with this, to power the first motor unit so that it produces an additional torque between the torque setpoint and the viscous torque until the viscous torque reaches the value of the torque setpoint.

2. A device according to claim 1, wherein the servo-control means are adapted to produce an operational setpoint for the first motor unit from a difference between the torque setpoint and an estimate of the torque generated by the viscous coupling means.

3. A device according to claim 2, wherein the operational setpoint for the first motor unit is limited to a particular maximum value.

4. A device according to claim 1, wherein the servo-control means are adapted to generate for the second motor unit an operational setpoint produced from a difference between the torque setpoint and an estimate of the torque produced by the viscous coupling means, the difference being processed by a corrector.

5. A device according to claim 1, wherein the viscous coupling means employs eddy currents to produce a torque proportional to a difference between speeds of an input and an output shafts of the coupling means.

6. A device according to claim 5, wherein the viscous coupling means comprise a cage having two flanges that carry permanent magnets that extend radially to define between the flanges a magnetic flux with flux lines that extend perpendicularly to a disk mounted to rotate between the flanges.

* * * * *